United States Patent
Mishra et al.

(10) Patent No.: US 12,273,187 B2
(45) Date of Patent: *Apr. 8, 2025

(54) EFFICIENT BIER FORWARDING OVER VARYING BSL DOMAIN USING HEADER STITCHING

(71) Applicant: Cisco Technology, Inc., San Jose, CA (US)

(72) Inventors: Mankamana Prasad Mishra, San Jose, CA (US); Nagendra Kumar Nainar, Morrisville, NC (US); Carlos M. Pignataro, Cary, NC (US); Ijsbrand Wijnands, Leuven (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,854

(22) Filed: May 23, 2023

(65) Prior Publication Data
US 2024/0014923 A1    Jan. 11, 2024

Related U.S. Application Data

(63) Continuation of application No. 17/208,293, filed on Mar. 22, 2021, now Pat. No. 11,705,983.

(51) Int. Cl.
*H04L 45/745* (2022.01)
*H04L 1/00* (2006.01)

(52) U.S. Cl.
CPC .......... *H04L 1/0007* (2013.01); *H04L 45/745* (2013.01)

(58) Field of Classification Search
CPC ..................... H04L 1/0007; H04L 45/745
See application file for complete search history.

(56) References Cited

U.S. PATENT DOCUMENTS

| 2015/0131658 A1* | 5/2015 | Wijnands ............ H04L 45/7453 370/392 |
| 2015/0131659 A1 | 5/2015 | Wijnands |

(Continued)

FOREIGN PATENT DOCUMENTS

WO    2019/237800 A1    12/2019

OTHER PUBLICATIONS

International Search Report corresponding to PCT/US2022./071078, dated Jun. 23, 2022, 13 pages.

*Primary Examiner* — Christopher M Crutchfield
*Assistant Examiner* — Tito Q Pham
(74) *Attorney, Agent, or Firm* — Baker Botts L.L.P.

(57) ABSTRACT

The present disclosure is directed to BIER forwarding over varying BSL domains, the methods including the steps of receiving, at a border node, a packet comprising a BIER header having a BIER bit string with a first bit string length; reading an incoming label of the packet comprising instructions to split the BIER header into a plurality of smaller headers associated with a plurality of smaller bit strings; generating a set of split bit masks; performing a separate bitwise AND operation on each split bit mask and the BIER bit string to generate the plurality of smaller bit strings, each copied to a corresponding smaller header of the plurality of smaller headers; and performing a lookup for each of the plurality of smaller headers on a respective forwarding table to determine one or more egress routers to which to transmit the packet.

18 Claims, 4 Drawing Sheets

(56) References Cited

U.S. PATENT DOCUMENTS

| | | |
|---|---|---|
| 2015/0138961 A1 | 5/2015 | Wijnands |
| 2016/0119159 A1 | 4/2016 | Zhao |
| 2016/0127142 A1* | 5/2016 | Tian .................. H04L 45/50 |
| | | 370/390 |
| 2018/0367456 A1 | 12/2018 | Wijnands |
| 2019/0297000 A1 | 9/2019 | Dutta |
| 2019/0394059 A1* | 12/2019 | Zhang .................. H04L 45/16 |
| 2020/0344162 A1* | 10/2020 | Dutta .................. H04L 47/724 |
| 2022/0109623 A1 | 4/2022 | Xie |
| 2022/0141127 A1* | 5/2022 | Li .................. H04L 12/4641 |
| | | 370/216 |
| 2022/0263760 A1 | 8/2022 | Tian |
| 2023/0115034 A1* | 4/2023 | Xie .................. H04L 9/40 |
| | | 709/238 |
| 2023/0283554 A1* | 9/2023 | Geng .................. H04L 45/50 |
| | | 370/389 |

* cited by examiner

FIG. 1

| BIT INDEX FORWARDING TABLE 210 | | |
|---|---|---|
| Incoming Label | Bit String | Next Hop |
| 8888 | 0100 0010 | Split Header (4 bits) Lookup-table (2) |

| BIT INDEX FORWARDING TABLE (2) 250 | | | |
|---|---|---|---|
| Incoming Label 260 | Bit 270 | Next Hop 280 | Outgoing Label 290 |
| 4444 | 0:0001 | N1 | 4444 |
| | 0:0010 | N2 | 4444 |
| | 0:0100 | N3 | 4444 |
| | 0:1000 | N4 | 4444 |
| | 1:0001 | N5 | 4444 |
| | 1:0010 | N6 | 4444 |
| | 1:0100 | N7 | 4444 |
| | 1:1000 | N8 | 4444 |

Example 1
BIER Bit string: 0100 0010 ⟶ 305

| Split Bit Masks | Index |
|---|---|
| 310a ⟶ 0000 1111 (316a 314a) | Set-ID 0 ⟶ 312a |
| 310b ⟶ 1111 0000 (314b 316b) | Set-ID 1 ⟶ 312b |

310 { 310a, 310b }

AND 330 { 0100 0010 ⟶ 305
         0000 1111 ⟶ 310a (Set-ID 0)
         0: 0010 ⟶ 350

AND 340 { 0100 0010 ⟶ 305
         1111 0000 ⟶ 310b (Set-ID 1)
         1: 0100 ⟶ 360

Example 2
BIER Bit string: 1011 0010 1000 1010 ⟶ 315

| Split Bit Masks | Index |
|---|---|
| 320a ⟶ 0000 0000 0000 1111 (324a) | Set-ID 0 ⟶ 322a |
| 320b ⟶ 0000 0000 1111 0000 (324b) | Set-ID 1 ⟶ 322b |
| 320c ⟶ 0000 1111 0000 0000 (324c) | Set-ID 2 ⟶ 322c |
| 320d ⟶ 1111 0000 0000 0000 (324d) | Set-ID 3 ⟶ 322d |

EFFICIENT BIER FORWARDING OVER VARYING BSL DOMAIN USING HEADER STITCHING

PRIORITY

This nonprovisional application is a continuation under 35 U.S.C. § 120 of U.S. patent application Ser. No. 17/208,293 filed on Mar. 22, 2021 and entitled "Efficient BIER Forwarding Over Varying BSL Domain Using Header Stitching" which is hereby incorporated by reference in its entirety.

TECHNICAL FIELD

The present disclosure generally relates to Bit Index Explicit Replication (BIER), and more specifically to systems and methods for efficient BIER forwarding over varying bit string length (BSL) domain using header stitching.

BACKGROUND

Bit Index Explicit Replication (BIER) is an architecture for forwarding multicast data packets through a multicast domain. Unlike traditional multicast forwarding techniques, BIER does not require a protocol for explicitly building multicast distribution trees or require intermediate nodes to maintain any per-flow state.

DESCRIPTION OF EXAMPLE EMBODIMENTS

Overview

According to an embodiment, a system may include one or more processors and one or more computer-readable non-transitory storage media comprising instructions that, when executed by the one or more processors, cause one or more components of the system to perform operations including, receiving, at a border node, a packet from an ingress router, the packet comprising a Bit Index Explicit Replication (BIER) header having a BIER bit string, the BIER bit string corresponding to a first bit string length; reading an incoming label of the packet, the incoming label associated with packet instructions to split the BIER header into a plurality of smaller headers associated with a plurality of smaller bit strings, each smaller bit string of the plurality of smaller bit strings corresponding to a second bit string length; generating a set of split bit masks; performing a separate bitwise AND operation on each split bit mask of the set of split bit masks and the BIER bit string to generate the plurality of smaller bit strings, each smaller bit string of the plurality of smaller bit strings copied to a corresponding smaller header of the plurality of smaller headers; and performing a lookup for each of the plurality of smaller headers on a respective forwarding table to determine one or more egress routers to which to transmit the packet.

Additionally, a length of each split bit mask of the set of split bit masks may correspond to the first bit string length. Also, a number of the set of split bit masks may correspond to a quotient of the first bit string length and the second bit string length.

Moreover, the operation of generating the set of split bit masks may further include assigning each split bit mask of the set of split bit masks a consecutive numerical index starting from zero.

Additionally, the operation of generating the set of split bit may further comprise, for each split bit mask, setting a set of consecutive bits to one (1), the set of consecutive bits having a bit length corresponding to the second bit string length; and setting all remaining bits to zero (0). Moreover, for a first split bit mask of the set of split bit masks having a numerical index of zero, the set of consecutive bits may start at a first bit position of the first split bit mask. Further, for each successive split bit mask of the set of split bit masks having a next consecutive numerical index, the set of consecutive bits may start at a next bit position, the next bit position corresponding to a next bit after a highest bit set to one (1) in the preceding split bit mask.

According to another embodiment, a method may include the steps of receiving, at a border node, a packet from an ingress router, the packet comprising a Bit Index Explicit Replication (BIER) header having a BIER bit string, the BIER bit string corresponding to a first bit string length; reading an incoming label of the packet, the incoming label associated with packet instructions to split the BIER header into a plurality of smaller headers associated with a plurality of smaller bit strings, each smaller bit string of the plurality of smaller bit strings corresponding to a second bit string length; generating a set of split bit masks; performing a separate bitwise AND operation on each split bit mask of the set of split bit masks and the BIER bit string to generate the plurality of smaller bit strings, each smaller bit string of the plurality of smaller bit strings copied to a corresponding smaller header of the plurality of smaller headers; and performing a lookup for each of the plurality of smaller headers on a respective forwarding table to determine one or more egress routers to which to transmit the packet.

According to yet another embodiment, one or more computer-readable non-transitory storage media may embody instructions that, when executed by a processor, cause the performance of operations, including receiving, at a border node, a packet from an ingress router, the packet comprising a Bit Index Explicit Replication (BIER) header having a BIER bit string, the BIER bit string corresponding to a first bit string length; reading an incoming label of the packet, the incoming label associated with packet instructions to split the BIER header into a plurality of smaller headers associated with a plurality of smaller bit strings, each smaller bit string of the plurality of smaller bit strings corresponding to a second bit string length; generating a set of split bit masks; performing a separate bitwise AND operation on each split bit mask of the set of split bit masks and the BIER bit string to generate the plurality of smaller bit strings, each smaller bit string of the plurality of smaller bit strings copied to a corresponding smaller header of the plurality of smaller headers; and performing a lookup for each of the plurality of smaller headers on a respective forwarding table to determine one or more egress routers to which to transmit the packet.

Technical advantages of certain embodiments of this disclosure may include one or more of the following. The systems and methods described herein may allow for the transmission of, from an ingress router to a border node of a multicast network, a single copy of a multicast packet having a BIER header with a larger bit string. At the border node, the BIER header with the larger bit string may be split into smaller headers having smaller bit strings. As a result, as further described below, the present disclosure allows for the seamless stitching together of BSL domains having varying capacities, thereby avoiding unnecessary transmission of numerous packet copies from an ingress router to corresponding egress routers.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

In accordance with Bit Index Explicit Replication (BIER) technology, when a multicast data packet enters the multicast domain, an ingress router (also referred to as bit-forwarding ingress router ("BFIR")) determines the set of egress routers (also referred to as bit-forwarding egress routers ("BFERs")) to which the packet is to be transmitted. (A multicast data packet enters a BIER domain at a BFIR, and leaves the BIER domain at one or more BFERs. A BFER is generally defined as a router that is connected to the receiver of an access network.) The BFIR encapsulates the packet in a BIER header. The BIER header contains a bit string, wherein each bit represents one BFER in the domain. For each bit that is set in the BIER header, the packet will be forwarded to the associated BFER.

Conventionally, for each BFER to which a packet is to be transmitted, a corresponding bit is set in the BIER header of the packet. While the architecture accommodates BIER headers to be of varying bit lengths, the technology is not able to process varying bit string lengths from BFIR to BFER domains. Specifically, BFIRs generally comprise heavy duty devices (e.g., data center nodes, aggregation nodes, core nodes, and the like) having increased capability; as such, they are able to process large bit strings, typically on the order of 2048 bits or more. In contrast, BFERs may comprise low-end devices (e.g., access devices, etc.) having lesser capability and may be able to process only smaller bit strings. Moreover, if the number of BFERs to which a packet is to be transmitted is on order of hundreds or thousands, it may not be possible for a packet to carry thousands of bits, simply because the corresponding BFER devices lack the processing capability. As a result, to account for the reduced capability of the BFERs, the BFIR may have to send many copies of the packet using smaller bit strings based on the bit string length supported by the BFERs.

The present disclosure is directed to a dynamic mechanism wherein varying bit string length domains may be integrated or "stitched" (i.e., smoothly seamed) together, allowing a BFIR to send a single copy of a packet with a BIER header that supports a larger bit string, which may then be split at a border node into smaller headers having smaller bit strings. Specifically, the present disclosure introduces systems and methods wherein the border node receives a packet from a BFIR (the packet comprising a BIER header having a larger bit string), determines that the incoming packet comprises a BIER header having a BIER bit string that is to be split or fragmented into a plurality of smaller headers having smaller bit strings, splits or fragments the BIER bit string into a plurality of smaller bit strings using a set of split bit masks, and copies the smaller bit strings into a plurality of smaller headers for transmission to appropriate BFERs. In accordance with the present disclosure, the statelessness of BIER is maintained, and reliance is only made on the larger bit string to identify the smaller bit strings. As a result, local state entries are not required on any of the border nodes.

Figure 1:
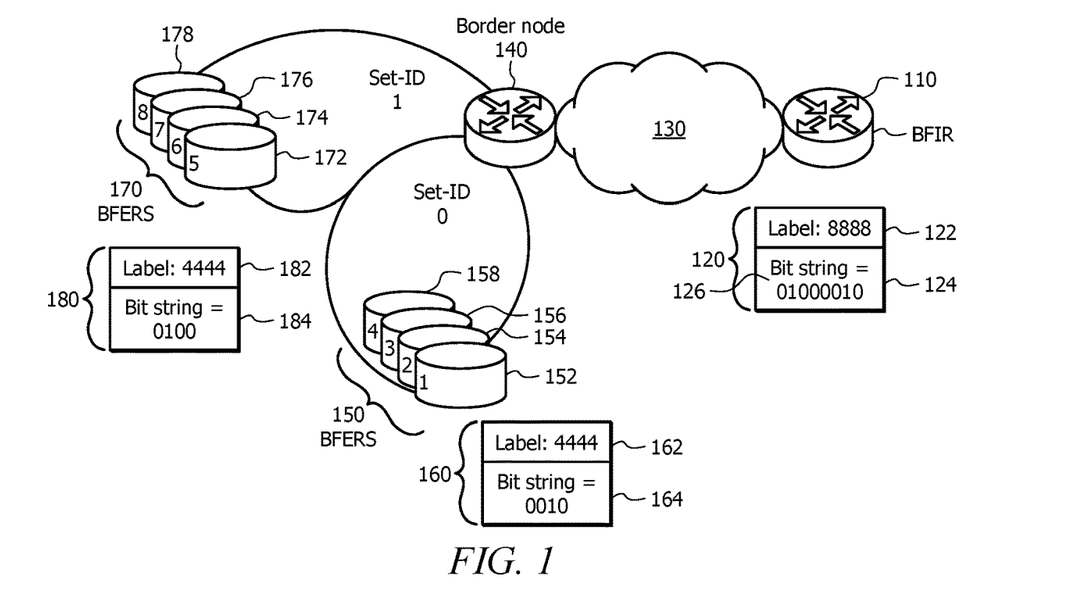
FIG. 1 illustrates a system for forwarding BIER packets over varying BSL domains using dynamic header stitching, in accordance with certain embodiments.

Reference is now made to FIG. 1, wherein is depicted a system 100 for forwarding packets over varying bit string length domains using dynamic header stitching, in accordance with the present disclosure. System 100 includes an ingress router, BFIR 110, for sending multicast packets over a network 130 to plurality of egress nodes. Although one BFIR 110 is shown in FIG. 1, it is to be understood that a multicast network may include a plurality of BFIRs. A BFIR 110 may receive a multicast packet 120 having an incoming label 122 and a BIER header 124. The BIER header 124 may include a bit string (for clarity, referred to hereafter as a "BIER bit string" 126), wherein each bit that is set to one (1) corresponds to an egress router that is to receive a copy of the multicast packet 120, as further described below. In the example of FIG. 1, the BIER bit string 126 comprises eight bits having the following values: 01000010. The second and seventh bits, as counted from right to left, are set to one (1) and correspond to two egress routers that are to receive to receive the multicast packet 120. Although the BIER header 124 is shown with a BIER bit string 126 having a "first bit string length" of eight, i.e., eight (8) bits, it is to be understood that the BIER header 124 may include a bit string of any length, as known and understood in the art. By way of example and not limitation, the BIER header 124 may include a BIER bit string having a length of 256 bits, 512 bits, 1024 bits, or 2048 bits.

The incoming label 122 of the multicast packet 120 may be associated with packet instructions that indicate to a border node 140 that the multicast packet 120 comprises a BIER header 124 having a BIER bit string 126 that is to be split or fragmented. Thus, in the example of FIG. 1, the incoming label 122 (shown as "8888") may instruct the border node 140 that the BIER header 124 having a BIER bit string 126 that is eight (8) bits in length is to be split into a plurality of smaller headers associated with a plurality of smaller bit strings, each smaller bit string corresponding to a "second bit string length", i.e., here, the second bit string length is four, i.e., four (4) bits. However, it is to be understood that the second bit string length may be any smaller length, comprising any number of bits, as indicated by the incoming label 122. It is further to be understood that the term "smaller" (as in smaller headers and/or smaller bit strings) refers to the relative size and/or length of the smaller headers and/or smaller bit strings as compared to the original BIER header 124 and/or the BIER bit string 126

With continued to reference to FIG. 1, the border node 140 may be an intermediate node that receives the multicast packet 120 from the BFIR 110 and coordinates the transmission of the multicast packet 120 to the appropriate BFERs. The border node 140 may be connected to and may serve different segments of the network, and each segment may have a different capability. In an embodiment, the border node 140 may comprise a router that is operable to "stitch together" or integrate the logic of a high capacity BFIR with lower-capacity BFERs. Specifically, the border node 140 may include functionality to read the incoming label 122 of the multicast packet 120 to determine whether the BIER header of the packet is to be split or fragmented into smaller headers having smaller bit strings before the packet is transmitted to corresponding BFERs.

FIG. 1 further shows two sets of egress routers or BFERs: a first set of BFERs 150; and a second set of BFERs 170. The first set of BFERs 150 comprises four egress routers 152, 154, 156, 158 (labeled as BFER-1, -2, -3, and -4). The second set of BFERs 170 comprises four egress routers 172, 174, 176, 178 (labeled as BFER-5, -6, -7, and -8). While FIG. 1 shows two sets of BFERs 150, 170, with each set having four BFERs 152-158, 172-178, it is to be understood that the system may include any number and/or sets of BFERs. Moreover, each set of BFERs 150, 170 may correspond to a Set-ID. As known in the art, Set-IDs provide a means of supporting egress routers when the number of routers exceeds the bit length. In the example of FIG. 1, the first set of BFERs 150 correspond to Set-ID 0 and the second set of BFERs 170 correspond to Set-ID 1. Additionally, the first four bits (bits 1 through 4) of the BIER bit string 126 may correspond to the four BFERs 152-158 of the first set of BFERs 150 (corresponding to Set-ID 0), and the second four bits (bits 5 through 8) of the BIER bit string 126 may correspond to the four BFERs 172-178 of the second set of BFERs 170 (corresponding to Set-ID 1). In other words, the first bit of the BIER bits string 126 may correspond to the first BFER 152, the second bit may correspond to the second BFER 154, the third bit may correspond to the third BFER 156, the fourth bit may correspond to the fourth BFER 158, the fifth bit may correspond to the fifth BFER 172, and so on. For each bit in the BIER bit string 126 that is set to one (1), the multicast packet 120 (or more specifically, a copy of the multicast packet 120) will be sent to the corresponding BFER on the receiving end. In this example, bits 2 and 7 are set to one (1), indicating that the multicast packet is to be transmitted to the second BFER 154 (BFER-2) and the seventh BFER 176 (BFER-7).

Figure 2:
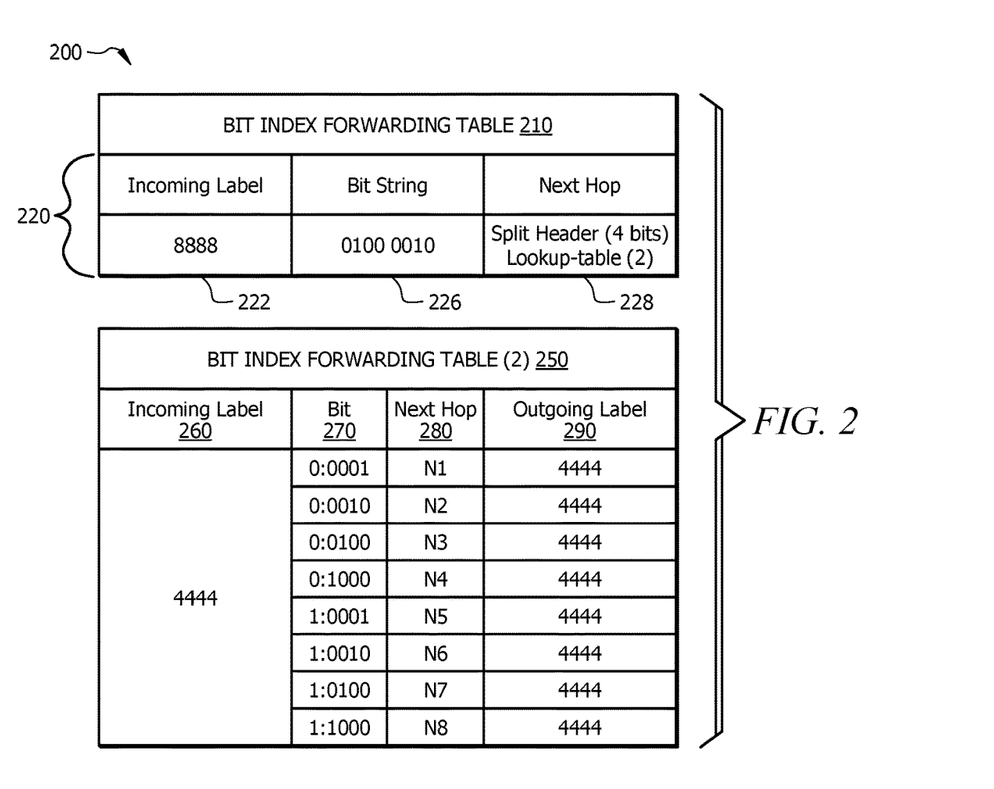
FIG. 2 illustrates sample BIER forwarding tables for use in a system for forwarding BIER packets over varying BSL domains, in accordance with certain embodiments.

With continued reference to FIG. 1 and with further reference to FIG. 2, in operation, the BFIR 110 transmits the multicast packet 120 to the border node 140 for further processing and transmission to the appropriate BFERs. When the border node 140 receives the multicast packet 120, the border node 140 reads the incoming label 122 of the multicast packet 120. The incoming label 122 may be associated with packet instructions to split or fragment the BIER header into a plurality of smaller headers associated with a plurality of smaller bit strings, each smaller bit string of the plurality of smaller bit strings corresponding to a second bit string length. In accordance with the present disclosure, the incoming label 122 is said to be "associated" with packet instructions to split the BIER header into a plurality of smaller headers in that the packet instructions may be incorporated within the incoming label 122 (e.g., the packet instructions may be directly embedded within incoming label 122 itself), or may be indirectly provided by the incoming label by pointing to a lookup table. With respect to the latter, in an embodiment, the incoming label may indicate that a new lookup needs to be performed on a Bit Index Forwarding Table (BIFT) 210.

The BIFT 210 is a BIER-associated forwarding table that provides the next-hop information for every possible BFER destination. More specifically, the BIFT 210 may include a plurality of fields 220, including an incoming label field 222 (corresponding to the incoming label 122 of the multicast packet 120), a BIER bit string field 226 (corresponding to the BIER bit string 126 of the multicast packet 120), and a next-hop field 228. When the incoming label 122 points to a lookup in the BIFT 210 (and the border node 140 performs the lookup), the BIFT 210 may indicate in the next-hop field 228 that the corresponding BIER header 124 is to be split into a plurality of smaller headers, each smaller header of the plurality of smaller headers associated with a smaller bit string. The next-hop field 228 may further indicate the length of the smaller bit string. In the example of FIG. 2, for a multicast packet having an incoming label of 8888 and a bit string of 01000010, the next-hop field 228 of the BIFT 210 instructs the border node 140 to split the BIER header 124 into smaller headers, each smaller header associated with a smaller bit string corresponding to a bit string length of four (4), and then to perform a lookup of the smaller headers in a second BIFT 250.

In response, the border node 140 may generate a set of "split bit masks," as that term is described herein. The length of each split bit mask may correspond to the first bit string length, i.e., namely the length of the BIER bit string 126. Additionally, the number of split bit masks to be created in the set of split bit masks may correspond to the quotient of the first bit string length (the length of the BIER bit string 126) and the second bit string length (the length of the desired smaller bit string, as reflected in the BIFT 210):

$$\frac{\text{First bit string length}}{\text{Second bit string length}} = \text{Number of split bit masks} \qquad \text{Eq. (1)}$$

Figure 3:
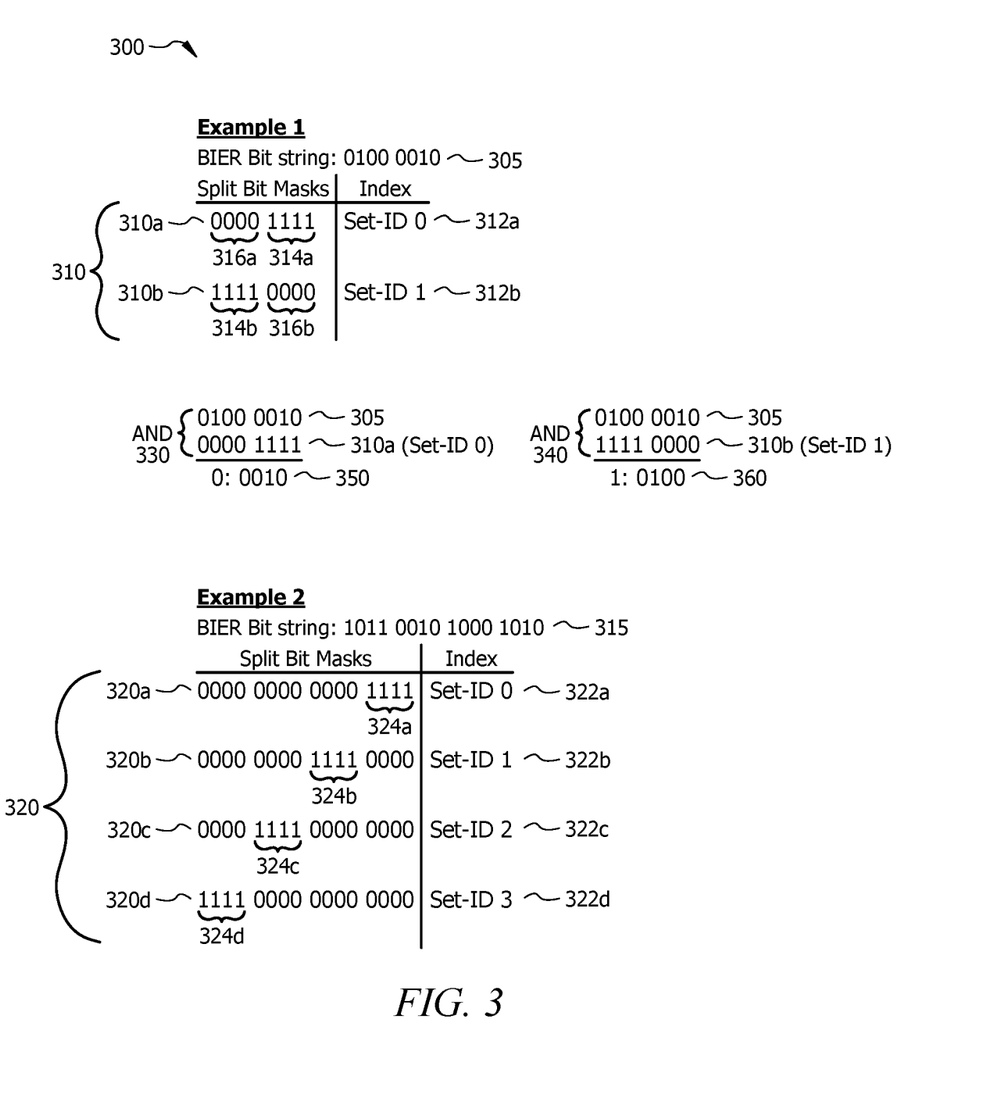
FIG. 3 illustrates a mechanism for generating split bit masks, in accordance with certain embodiments.

Reference is now made to FIG. 3, wherein is shown a mechanism for generating a set of split bit masks for the purpose of splitting a BIER header having a BIER bit string into a plurality of smaller headers, each smaller header associated with a smaller bit string. For purposes of illustration, and in accordance with the examples shown in FIGS. 1 and 2, consider Example 1 of FIG. 3, wherein a BIER header comprises the BIER bit string 305 comprising the following eight (8) bits: 01000010. Based on the instructions of the next-hop field 228 of the BIFT 210 (shown in FIG. 2), the BIER header is to be split into smaller headers, each with a bit string length of four (4) bits. Using Eq. (1), this requires the creation of two split bit masks, (8 bits/4 bits). The two split bit masks 310a, 310b (collectively, the set of split bit masks 310) are shown in FIG. 3. Each split bit mask 310a, 310b is assigned a consecutive numerical index 312a, 312b starting from zero (0). These indices will serve as the "Set-IDs". By way of example, the first split bit mask 310a is assigned an index of zero (0) (labeled in FIG. 3 as "Set-ID 0" 312a) and the second split bit mask 310b is assigned an index of one (1) (labeled in FIG. 3 as "Set-ID 1" 312b). Additionally, as described above, the length of each split bit mask corresponds to the first bit string length, which is the length of the BIER bit string 126 of the BIER header 124, i.e., here, eight (8) bits.

For each split bit mask 310a, 310b, a set of consecutive bits are set to one (1) and all remaining bits are set to zero (0). The length of each set of consecutive bits corresponds to the second bit string length. In other words, the number of consecutive bits set to one (1) equals the second bit string length. Here, the second bit string length, as described above, is four (4) bits. Thus, four consecutive bits will be set to one (1), and all remaining bits will be set to zero (0).

To determine which set of consecutive bits will be set to one (1) for a given split bit mask, the following methodology may be used. For the first split bit mask 310a having a numerical index of zero (0) (e.g., Set-ID 0 312a), the set of consecutive bits starts at the first bit position of the first split bit mask 310a and goes to the bit corresponding to the numerical value of the second bit string length, i.e., the set of consecutive bits starts at the first bit position and goes to the fourth bit, which corresponds to the second bit string length (i.e., 4 bits). Thus, bits 1 through 4 (corresponding to the first set of consecutive bits 314a) will be set to one (1), and all remaining bits 316a will be set to zero (0). Then, for each successive split bit mask having a next consecutive numerical index, the set of consecutive bits starts at a "next bit position," which corresponds to a next bit after the last or highest bit set to one (1) in the preceding split bit mask. Therefore, for the second split bit mask 310b having the next consecutive numerical index of one (1) (e.g., Set-ID 1 312b), the set of consecutive bits starts at the next bit position (e.g., bit 5) which corresponds to the next bit after the highest bit (e.g., bit 4) set to one (1) in the preceding split bit mask (e.g., first split bit mask 310a). In other words, for the second split bit mask, the next four bits, bits 5 through 8 (corresponding to the second set of consecutive bits 314b) will be set to one (1) and all remaining bits 316b will be set to zero (0).

With further reference to FIG. 3, to further illustrate the creation of split bit masks in conjunction with a BIER header comprising a BIER bit string having a longer bit length, consider Example 2, showing a BIER bit string 315 comprising the following 16 bits: 1011001010001010. Suppose the next-hop field of the BIFT instructs the border node to split the BIER header into smaller headers, each smaller header associated with a smaller bit string corresponding to a bit string length of four (4) bits. In this scenario, four split bit masks 320a, 320b, 320c, 320d (collectively, the set of split bit masks 320) may be generated, as the quotient of the first bit string length (i.e., 16 bits) and the second bit string length (i.e., 4 bits) is four. Next, each split bit mask 320a-d of the set of split bit masks 320 is assigned a consecutive numerical index 322a-322d starting from zero (0). By way of example, the first split bit mask 320a is assigned an index of zero (0) (labeled as "Set-ID 0" 322a), the second split bit mask 320b is assigned an index of one (1) (labeled as "Set-ID 1" 322b), the third split bit mask 320c is assigned an index of two (2) (labeled as "Set-ID 2" 322c), and the fourth split bit mask 320d is assigned an index of three (3) (labeled as "Set-ID 3" 322d). For each split bit mask 320a-d, a set of consecutive bits—the length of each set of consecutive bits corresponding to the second bit string length—are set to one (1) and all remaining bits are set to zero (0). Here, the second bit string length is 4 bits. Thus, in each split bit mask 320a-d, four consecutive bits will be set to one (1), and all remaining bits will be set to zero (0). For the first split bit mask 320a having a numerical index of zero (0) (e.g., Set-ID 0 322a), the set of consecutive bits starts at a first bit position of the first split bit mask 320a and goes to the fourth bit, which corresponds to the second bit string length. Thus, bits 1 through 4 (corresponding to the first set of consecutive bits 324a) will be set to one (1), and all remaining bits will be set to zero (0). In other words, in the first split bit mask 320a, the first four bits are set to one (1), and the remaining bits are set to zero (0). Then, for each successive split bit mask 320b-d having a next consecutive numerical index 322b-d, the set of consecutive bits starts at a next bit position corresponding to the next bit after the last or highest bit set to one (1) in the preceding split bit mask. In the second split bit mask 320b having a next consecutive numerical index of one (1), the set of consecutive bits starts at the next bit position (e.g., bit 5) which corresponds to the next bit after the highest bit (e.g., bit 4) set to one (1) in the preceding split bit mask. Thus, the next set of four bits (corresponding a second set of consecutive bits 324b, i.e., bits 5-8) are set to one (1), and the remaining bits are set to zero. In the third split bit mask 320c having a next consecutive numerical index of two (2), the set of consecutive bits starts at the next bit position (e.g., bit 9) which corresponds to the next bit after the highest bit (e.g., bit 8) set to one (1) in the preceding split bit mask. Thus, the next set of four bits (corresponding a third set of consecutive bits 324c, i.e., bits 9-12) are set to one (1), and the remaining bits are set to zero. The same methodology is applied to generate the fourth split bit mask 320d. Specifically, in the fourth split bit mask 320d having a next consecutive numerical index of three (3), the set of consecutive bits starts at the next bit position (e.g., bit 13) which corresponds to the next bit after the highest bit (e.g., bit 12) set to one (1) in the preceding split bit mask; in other words, the last set of four bits (corresponding to a fourth set of consecutive bits 324d, i.e., bits 13-16) are set to one (1) and the remaining bits are set to zero. In this manner, split bit masks may be generated for any BIER header having a BIER bit string of any length.

Returning to the split bit masks of Example 1 in FIG. 3, once the split bit masks have been generated, a bitwise AND operation is separately performed on each split bit mask and the BIER bit string. Thus, when an AND operation 330 is performed between the BIER bit string 305 (01000010) and the first split bit mask 310a (00001111), the result is a smaller bit string 350, namely 0010. Since the numerical index of the first split bit mask 310 is zero (e.g., Set-ID 0 312a), the resulting smaller bit string 350 is labeled "0:0010". Likewise, when an AND operation 340 is performed between the BIER bit string 305 (01000010) and the second split bit mask 310b (11110000), the result is a smaller bit string 360, namely 0100. Since the numerical index of the second split bit mask 310b is one (e.g., Set-ID 1 312b), the resulting smaller bit string 360 is labeled "1:0100". The resulting set of smaller bit strings 350, 360 may be copied to corresponding smaller headers. The smaller headers may correspond to new incoming labels, as determined and/or correlated by the border node 140.

With further reference to FIG. 2, a lookup may then be performed in a second BIFT 250 of the set of smaller headers having smaller bit strings 350, 360. Specifically, the second BIFT 250 may list all of the potential combinations of the smaller bit strings for an 8-bit bit string that that has been split into 4-bit bit strings. The second BIFT 250 may further correlate each smaller bit string to the appropriate BFER to which a multicast packet may be transmitted. In the Example of FIGS. 1 and 2, the second BIFT 250 indicates that the "next hops" (shown in the second next-hop field 280 of the second BIFT 250) for headers having bit strings 0:0010 and 1:0100 are nodes N2 and N7, corresponding to BFERs 154 and 176. The second BIFT 250 also indicates the outgoing label 290, which corresponds to a local value advertised by the next hop (BFER) destination. Based on the next hop instructions of the second BIFT 250, the border node may then replicate the multicast packet 120 and associate a replicated copy of the multicast packet 120 with the appropriate smaller headers with corresponding smaller bit strings (e.g., 0:0010 and 1:0100), so that the multicast packet 120 may be sent to the appropriate BFERs. The multicast packet 120 (the term including and encompassing its replicated copies) may then be transmitted to the corresponding BFERs. In this manner, BIER headers comprising larger BIER bit strings may be split or fragmented into smaller headers having smaller bit strings, thereby allowing for the stitching or integration of BSL domains having varying bit string length capabilities.

Figure 4:
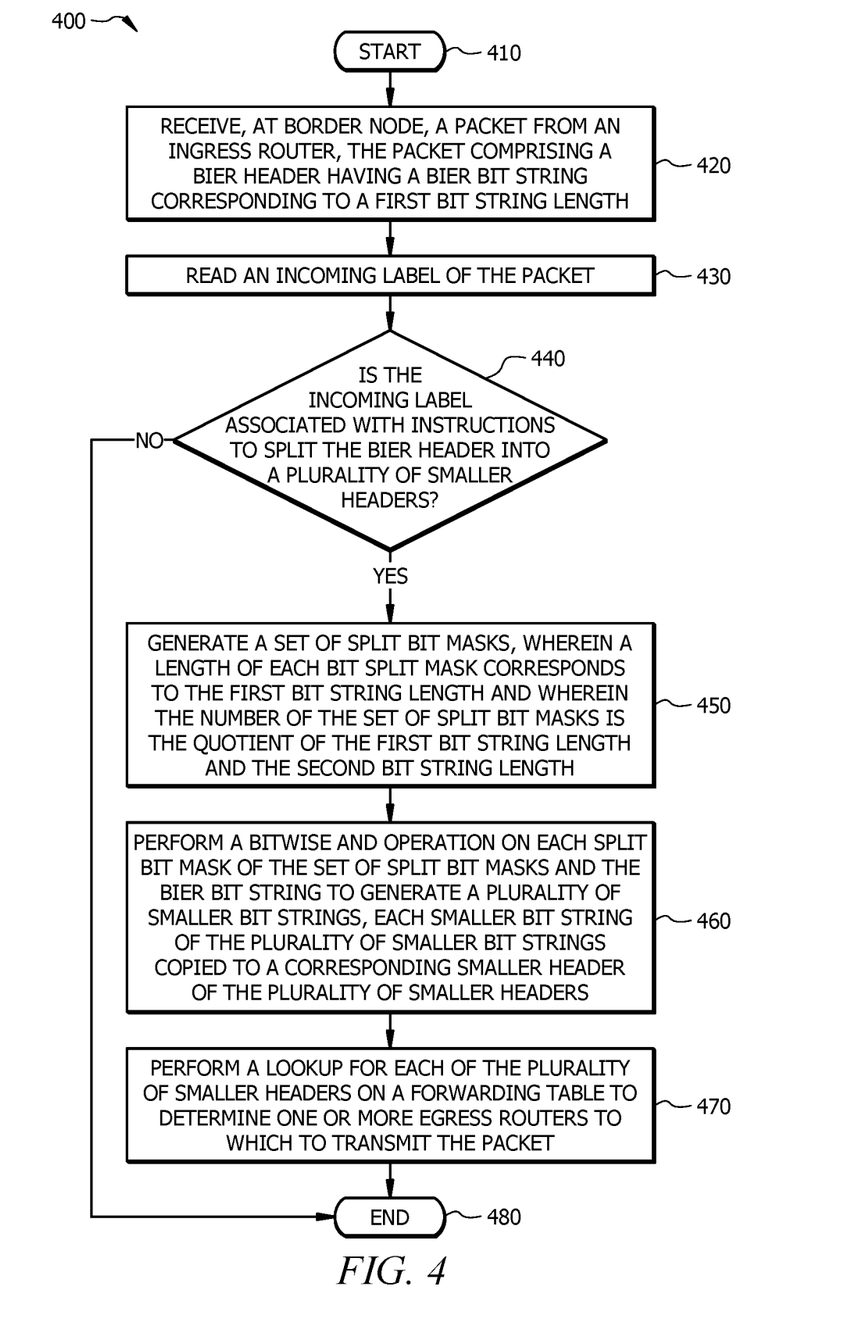
FIG. 4 illustrates a flow diagram of a method for forwarding BIER packets over varying BSL domains using dynamic header stitching, in accordance with certain embodiments.

Reference is now made to FIG. 4, wherein method 400 depicts a flow diagram of a method for forwarding BIER packets over varying BSL domains using dynamic header stitching, in accordance with certain embodiments. The steps of method 400 may be in accordance with the systems, methods, and operations outlined in conjunction with FIGS. 1-3. As such, similar and corresponding terms described in conjunction with FIGS. 1-3 may have the same meaning when used in conjunction with method 400 of FIG. 4. Additionally, the present disclosure incorporates by reference FIGS. 1-3 and their corresponding descriptions for the purposes of explaining, expounding upon, or otherwise clarifying the steps of method 400.

Method 400 may be performed in a multicast environment having at least one ingress router (i.e., BFIR) and one or more sets of egress routers (i.e., BFERs). Each set of BFERs may comprise any number of egress routers, as known in the art. Additionally, each set of BFERs may correspond to a Set-ID.

In accordance with method 400, it is to be understood that a multicast packet is received at a BFIR. The multicast packet may include an incoming label and a BIER header. The BIER header may include a bit string (referred to herein as a "BIER bit string"), wherein each bit that is set to one (1) corresponds to a BFER that is to receive a copy of the multicast packet. For purposes the present disclosure, the BIER bit string of the incoming multicast packet comprises a "first bit string length". The first bit string length may be any length, as known and understood in the art.

The incoming label of the multicast packet may be associated with packet instructions that indicate to a border node that the multicast packet comprises a BIER header having a BIER bit string that needs to be split or fragmented into smaller headers with smaller bit strings having a "second bit string length". It is to be understood that the second bit string length may be any length of bits.

Method 400 may be performed at border node located between a BFIR and a set of BFERs in a multicast network. In an embodiment, the border node may comprise a router that may be connected to and may serve different segments of the network, and is operable to integrate the logic of a high capacity BFIR with lower-capacity BFERs. Specifically, the border node may include functionality to read the incoming label of the multicast packet to determine whether the BIER header of the packet is to be split or fragmented into smaller headers having smaller bit strings before the packet is transmitted to corresponding BFERs. Although the present disclosure describes the performance of method 400 in conjunction with a border node, it is to be understood that method 400 may be performed by any component, element, or module associated with multicast environment without departing from the spirit or scope of the present disclosure.

The method may begin at step 410. At step 420, a border node may receive a multicast packet from an ingress router (e.g., a BFIR), the multicast packet comprising a BIER header having a BIER bit string, the BIER bit string corresponding to a first bit string length, as described above.

At step 430, the border node may read an incoming label of the multicast packet. The incoming label may be associated with packet instructions to split or fragment the BIER header into a plurality of smaller headers, each smaller header of the plurality of smaller headers associated with a smaller bit string, and each smaller bit string corresponding to a second bit string length. In accordance with the present disclosure, the incoming label is said to be "associated" with packet instructions to split the BIER header into a plurality of smaller headers in that the packet instructions may be incorporated within the incoming label (e.g., the packet instructions may be directly embedded within incoming label itself), or may be indirectly provided by the incoming label by pointing to a lookup table. With respect to the latter, in an embodiment, the incoming label may indicate that a new lookup needs to be performed on a Bit Index Forwarding Table (BIFT). The BIFT may provide the next-hop information for every possible BFER destination and may include a plurality of fields, including an incoming label field (corresponding to the incoming label of the packet), a BIER bit string field (corresponding to the BIER bit string of the packet), and a next-hop field. When the border node performs a lookup for the incoming label, the BIFT may indicate in the next-hop field (or otherwise) that the corresponding BIER header is to be split into a plurality of smaller headers, each smaller header of the plurality of smaller headers associated with a smaller bit string. The BIFT may further indicate the length of the smaller bit string.

At step 440, a determination may be made as to whether the incoming label is associated with packet instructions to split the BIER header into a plurality of smaller headers. If, at step 440, it is determined that the incoming label is not associated with packet instructions to split the BIER header into a plurality of smaller headers, the method may end at step 480. If, however, at step 440, it is determined that the incoming label is associated with packet instructions to split the BIER headers into a plurality of smaller headers, the method may proceed to step 450.

At step 450, the border node may generate a set of split bit masks. The number of split bit masks in the set may correspond to a quotient of the first bit string length (i.e., the length of the BIER bit string) and the second bit string length (the desired length of the smaller bit strings). The length of each split bit mask of the set of split bit masks may correspond to the first bit string length. The mechanism of generating the set of split bit masks may be in accordance with the description provided in conjunction with FIG. 3. Specifically, each split bit mask of the set of split bit masks may be assigned a consecutive numerical index starting from zero (0). These indices will serve as the "Set-IDs". For each split bit mask, a set of consecutive bits—the length of each set of consecutive bits corresponding to the second bit string length—are set to one (1) and all remaining bits are set to zero (0). Specifically, for the first split bit mask of the set of split bit masks (having a numerical index of zero), the set of consecutive bits starts at a first bit position of the first split bit mask and goes to the bit corresponding in numerical value to the second bit string length. Then, for each successive split bit mask of the set of split bit masks having a next consecutive numerical index, the set of consecutive bits starts at a next bit position, wherein the next bit position corresponds to a next bit after a last or highest bit set to one (1) in the preceding split bit mask. Again, all remaining bits are set to zero (0). In this manner, split bit masks may be generated for any BIER header having a BIER bit string of any length.

At step 460, a separate bitwise AND operation may be performed on each split bit mask of the set of split bit masks and the BIER bit string to thereby generate a plurality of smaller bit strings, each smaller bit string of the plurality of smaller bit strings copied to a corresponding smaller header of the plurality of smaller headers. The smaller headers may also correspond to new incoming labels, as determined and/or correlated by the border node.

At step 470, a lookup may be performed in a second respective forwarding table, i.e., second BIFT, for each of the plurality of smaller headers having a smaller bit string to determine one or more egress routers to which to transmit the packet. Specifically, the second BIFT may list all of the potential combinations of the smaller bit strings. The second BIFT may further correlate each smaller bit string to the appropriate BFERs to which the multicast packet is to be transmitted. Based on the instructions in the second forwarding table, the border node may then replicate the multicast packet, associating a copy of the multicast packet with the appropriate smaller headers with corresponding smaller bit strings, so that the multicast packet may be sent to the appropriate BFERs. The multicast packet (the term including its replicated copies) may then be transmitted to the corresponding BFERs. In this manner, BIER headers comprising larger BIER bit strings may be split or fragmented into smaller headers having smaller bit strings, thereby allowing for the stitching or integration of BSL domains having varying bit string length capabilities.

In sum, the systems and methods of the present disclosure may allow for an ingress router to transmit a single copy of a multicast packet having a BIER header with a larger bit string. At the border node, the BIER header with the larger bit string may be split into smaller headers having smaller bit strings for transmission to the appropriate egress routers. As a result, the present disclosure allows for the seamless stitching together of BSL domains having varying capacities, thereby avoiding unnecessary transmission of numerous packet copies from an ingress router to corresponding egress routers.

Figure 5:
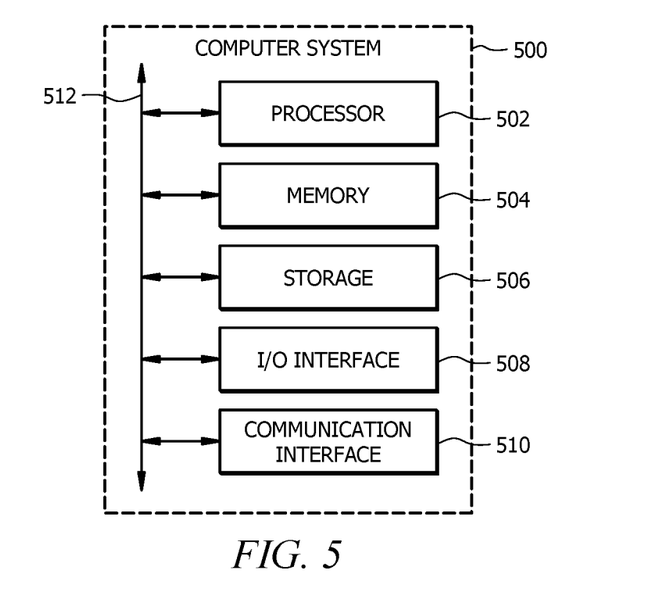
FIG. 5 illustrates a computer system, in accordance with certain embodiments.

Reference is now made to FIG. 5, wherein is shown an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable T/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both,"

unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
   one or more processors; and
   one or more computer-readable non-transitory storage media comprising instructions that, when executed by the one or more processors, cause one or more components of the system to perform operations comprising:
   receiving, at a border node, a first packet, the first packet comprising a Bit Index Explicit Replication (BIER) header having a first BIER bit string, the first BIER bit string corresponding to a first bit string length;
   splitting the first BIER bit string into a plurality of sub-bitstrings, wherein each sub-bitstring of the plurality of sub-bitstrings has a bit string length smaller than the first bit string length, wherein splitting the first BIER bit string comprises generating a set of split bit masks to produce the plurality of sub-bitstrings, wherein a number of the set of split bit masks corresponds to a quotient of the first bit string length and a bit string length of the plurality of sub-bitstrings, wherein the length of each split bit mask corresponds to the first bit string length;
   generating a second BIER header including a second BIER bit string corresponding to a first sub-bitstring of the plurality of sub-bitstrings;
   creating a second packet with the second BIER header; and
   forwarding the second packet toward the destination identified in the second BIER header.

2. The system of claim 1, the operations further comprising:
   generating a third BIER header including a third BIER bit string corresponding to a second sub-bitstring of the plurality of sub-bitstrings;
   creating a third packet with the third BIER header; and
   forwarding the third packet toward the destination identified in the third BIER header.

3. The system of claim 2, wherein the destination identified in the second BIER header is different than destination identified in the third BIER header.

4. The system of claim 1, wherein the total length of the plurality of sub-bitstrings is equal to the first bit string length.

5. The system of claim 1, wherein the first bit string length is 2048 bits or more, and the first sub-bitstring has a length of 1024 bits or fewer.

6. The system of claim 1, wherein the first bit string length is 2048 bits or more, and each of the plurality of sub-bitstrings has a length of 1024 bits or fewer.

7. A method of forwarding a packet, comprising:
   receiving, at a border node, a first packet, the first packet comprising a Bit Index Explicit Replication (BIER) header having a first BIER bit string, the first BIER bit string corresponding to a first bit string length;
   splitting the first BIER bit string into a plurality of sub-bitstrings, wherein each sub-bitstring of the plurality of sub-bitstrings has a bit string length smaller than the first bit string length, wherein splitting the first BIER bit string comprises generating a set of split bit masks to produce the plurality of sub-bitstrings, wherein a number of the set of split bit masks corresponds to a quotient of the first bit string length and a bit string length of the plurality of sub-bitstrings, wherein the length of each split bit mask corresponds to the first bit string length;
   generating a second BIER header including a second BIER bit string corresponding to a first sub-bitstring of the plurality of sub-bitstrings;
   creating a second packet with the second BIER header; and
   forwarding the second packet toward the destination identified in the second BIER header.

8. The method of claim 7, further comprising:
generating a third BIER header including a third BIER bit string corresponding to a second sub-bitstring of the plurality of sub-bitstrings;
creating a third packet with the third BIER header; and
forwarding the third packet toward the destination identified in the third BIER header.

9. The method of claim 8, wherein the destination identified in the second BIER header is different than destination identified in the third BIER header.

10. The method of claim 7, wherein the total length of the plurality of sub-bitstrings is equal to the first bit string length.

11. The method of claim 7, wherein the first bit string length is 2048 bits or more, and the first sub-bitstring has a length of 1024 bits or fewer.

12. The method of claim 7, wherein the first bit string length is 2048 bits or more, and each of the plurality of sub-bitstrings has a length of 1024 bits or fewer.

13. One or more computer-readable non-transitory storage media embodying instructions that, when executed by a processor, cause the performance of operations comprising:
receiving, at a border node, a first packet, the first packet comprising a Bit Index Explicit Replication (BIER) header having a first BIER bit string, the first BIER bit string corresponding to a first bit string length;
splitting the first BIER bit string into a plurality of sub-bitstrings, wherein each sub-bitstring of the plurality of sub-bitstrings has a bit string length smaller than the first bit string length, wherein splitting the first BIER bit string comprises generating a set of split bit masks to produce the plurality of sub-bitstrings, wherein a number of the set of split bit masks corresponds to a quotient of the first bit string length and a bit string length of the plurality of sub-bitstrings, wherein the length of each split bit mask corresponds to the first bit string length;
generating a second BIER header including a second BIER bit string corresponding to a first sub-bitstring of the plurality of sub-bitstrings;
creating a second packet with the second BIER header; and
forwarding the second packet toward the destination identified in the second BIER header.

14. The non-transitory storage media of claim 13, the operations further comprising:
generating a third BIER header including a third BIER bit string corresponding to a second sub-bitstring of the plurality of sub-bitstrings;
creating a third packet with the third BIER header; and
forwarding the third packet toward the destination identified in the third BIER header.

15. The non-transitory storage media of claim 14 wherein the destination identified in the second BIER header is different than destination identified in the third BIER header.

16. The non-transitory storage media of claim 13, wherein the total length of the plurality of sub-bitstrings is equal to the first bit string length.

17. The non-transitory storage media of claim 13, wherein the first bit string length is 2048 bits or more, and the first sub-bitstring has a length of 1024 bits or fewer.

18. The non-transitory storage media of claim 13, wherein the first bit string length is 2048 bits or more, and each of the plurality of sub-bitstrings has a length of 1024 bits or fewer.

* * * * *